3,380,808
PROCESS FOR THE MANUFACTURE OF
PHOSPHORUS PENTASULFIDE OF PRE-
DETERMINED REACTIVITY
Hermann Niermann, Bruhl, near Cologne, and Heinz F.
Harnisch, Lovenich, near Cologne, Germany, assignors
to Knapsack Aktiengesellschaft, Knapsack, near Co-
logne, Germany, a corporation of Germany
No Drawing. Filed Nov. 8, 1965, Ser. No. 506,880
4 Claims. (Cl. 23—206)

ABSTRACT OF THE DISCLOSURE

A process whereby fine-grained phosphorus pentasulfide having a low predetermined reactivity of 40 to 10° per hour is prepared by initially grinding to a desired grain size, and thereafter annealing the material at about 140°–180° C. for about 15–48 hours.

The present invention relates to a process for the manufacture of phosphorus pentasulfide of predetermined reactivity by annealing.

The influence the temperature may exert on the reactivity of phosphorus pentasulfide is known. For example, German Specification No. 1,147,923 indicates that the manner of cooling a $P_2S_5$-melt determines the reactivity of $P_2S_5$. Slow cooling results in products having a reactivity lower than products obtained by rapid cooling.

German Specification No. 1,150,659 describes a process for reducing the reactivity of $P_2S_5$, wherein a product, such as obtained after allowing a phosphorus pentasulfide melt to solidify, is annealed at a temperature between 150° C. and the melting point of $P_2S_5$ for a period sufficient to obtain $P_2S_5$ having a predetermined degree of reactivity.

German Specification No. 1,171,883 discloses that $P_2S_5$ of improved reactivity is obtained when a $P_2S_5$ melt is allowed directly to cool down to room temperature.

The manufacturing conditions used in these conventional processes incur the formation of $P_2S_5$ flakes or scales. These require grinding and corresponding reduction in grain size when a fine-grained product is desired to be obtained with the result that the $P_2S_5$ properties are modified, i.e., the initial reactivity of $P_2S_5$ is increased.

The following experiment demonstrates that the increase in reactivity of annealed $P_2S_5$-scales is a function of the grinding period or surface area of the material.

Annealed $P_2S_5$ in scale form with a reactivity of 30° C./hr. was ground for different periods of time in a ball mill. The reactivity of the single specimens was determined and the material subjected to screen analysis. The screen analysis data, which permitted the total surface area of the powder to be calculated, are indicated in the following table:

| Grinding period (min.) | Surface area (cm.²/50 g.) | Reactivity (° C./hr.) |
|---|---|---|
| 0 | 2,100 | 31 |
| 3 | 6,800 | 78 |
| 15 | 11,300 | 120 |
| 30 | 18,000 | 200 |
| 120 | 23,500 | 250 |

The reactivity was determined as follows:

50 grams $P_2S_5$ in scale form were placed into a calorimeter provided with a thermometer and an agitator and charged with 100 cc. ethyl hexanol having a temperature of 30° C. After the $P_2S_5$ had been introduced into the ethyl hexanol, the temperature increase in the calorimeter was continuously measured while the agitator was kept running. The inclination of the temperature-time-straight line served as an index for the reactivity, and the temperature increase in ° C. per hour served as a unit of measure. The following table indicates the measured values:

| Annealing temperature, °C.. | 100 | 110 | 130 | 140 | 150 | 160 | 170 | 180 | 200 | 210 | 220 |
|---|---|---|---|---|---|---|---|---|---|---|---|
| Reactivity after— | | | | | | | | | | | |
| 24 hrs | 360 | 210 | 120 | 40 | 36 | | | 10.0 | 2.0 | 1.2 | 1.0 |
| 48 hrs | 360 | 200 | 175 | 36 | 18 | 11.5 | 11.5 | 4.2 | 3.5 | 1.0 | 1.0 |

The present invention now provides a process for making fine grained $P_2S_5$ of low, predeterminable reactivity, wherein solidified $P_2S_5$ in flake or scale form, such as obtained by a conventional process by allowing a $P_2S_5$-melt to solidify, is first ground so as to produce material having a desired grain size and the ground material is successively annealed.

Grinding low reactivity $P_2S_5$-flakes or scales results in the reactivity of $P_2S_5$ being considerably increased, but annealing ground $P_2S_5$ enables material of predetermined low reactivity to be produced in view of the fact that the equation:

$$C_1 \cdot \log (C_2 - R) = \frac{-a}{T} + \log C_2$$

in which $C_1$ and $C_2$ mean constants, R means the reactivity, $a$ means the energy of activation and T means the absolute temperature, permits calculating the reactivity for sufficiently large and comparable annealing periods.

For producing a reactivity of 40° to 10° C. per hour, ground and fine-grained phosphorus pentasulfide is annealed at a temperature of between 140 and 180° C. for a period of 15 to 48 hours, preferably about 24 hours. Preferably, the fine-grained powder of ground phosphorus pentasulfide is annealed in containers filled therewith and placed in a temperature-regulated space, i.e., a heating cabinet.

EXAMPLE

Liquid phosphorus pentasulfide was placed at about 350° C. into the heated basin below a dip roll. The dip roll was cooled with water at 20° C. and rotated at a speed of 10 r.p.m. The $P_2S_5$ solidified within 3 seconds on the roll surface area in a layer 0.6 mm. thick and was scraped off in the form of scales by means of a knife. The material scraped off had a temperature of 85–90° C. The scales were ground and heated in sealed barrels for 24 hours at 150 and 180° C., respectively. After having been annealed, the reactivity was 30° C./hr. and 11° C./hr., respectively.

We claim:

1. A process for making fine-grained phosphorus pentasulfide having a low predetermined reactivity of 40–10° C. per hour comprising grinding solidified $P_2S_5$ to obtain granular material having a desired grain size and thereafter annealing the granular material at a temperature of about 140°–180° C. for about 15–48 hours.

2. The process of claim 1 wherein the phosphorus pentasulfide is annealed for a period of about 24 hours.

3. The process of claim 1 wherein the solidified $P_2S_5$ is utilized in the form of flakes or scales prior to grinding.

4. The process of claim 1 wherein ground phosphorus pentasulfide placed in sealed containers is annealed in a temperature-regulated space.

References Cited

UNITED STATES PATENTS

| | | | |
|---|---|---|---|
| 3,146,069 | 8/1964 | Robota | 23—206 |
| 3,183,062 | 5/1965 | Taylor | 23—206 |
| 3,282,653 | 11/1966 | Robota | 23—273 |

OSCAR R. VERTIZ, *Primary Examiner.*

G. PETERS, *Assistant Examiner.*